(12) United States Patent
Ehrlich et al.

(10) Patent No.: US 10,936,498 B2
(45) Date of Patent: Mar. 2, 2021

(54) SHINGLED MAGNETIC RECORDING DRIVE THAT UPDATES MEDIA CACHE DATA IN-PLACE

(71) Applicants: KABUSHIKI KAISHA TOSHIBA, Tokyo (JP); Toshiba Electronic Devices & Storage Corporation, Tokyo (JP)

(72) Inventors: Richard M. Ehrlich, Saratoga, CA (US); Andre C. Hall, Fremont, CA (US)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 177 days.

(21) Appl. No.: 15/919,049

(22) Filed: Mar. 12, 2018

(65) Prior Publication Data

US 2019/0278710 A1    Sep. 12, 2019

(51) Int. Cl.
*G06F 12/0871*    (2016.01)
*G06F 3/06*    (2006.01)
*G11B 20/12*    (2006.01)

(52) U.S. Cl.
CPC .......... *G06F 12/0871* (2013.01); *G06F 3/064* (2013.01); *G11B 20/1217* (2013.01); *G06F 2212/224* (2013.01); *G11B 2020/1232* (2013.01); *G11B 2020/1238* (2013.01)

(58) Field of Classification Search
CPC ................ G06F 12/0871; G06F 3/064; G06F 2212/224; G11B 20/1217; G11B 2020/1238; G11B 2020/1232
See application file for complete search history.

(56) References Cited

U.S. PATENT DOCUMENTS

| | | | |
|---|---|---|---|
| 9,311,939 B1 * | 4/2016 | Malina | G11B 20/10527 |
| 9,317,436 B2 * | 4/2016 | Pan | G06F 12/0804 |
| 9,361,944 B1 * | 6/2016 | Aoki | G11B 19/041 |

(Continued)

OTHER PUBLICATIONS

Anonymous, "File Storage Hardware and Disk Organization", Oct. 4, 2003, pp. 1-3, https://web.archive.org/web/20031004180933/http://www.ntfs.com/hard-disk-basics.htm (Year: 2003).*

(Continued)

*Primary Examiner* — Christopher D Birkhimer
(74) *Attorney, Agent, or Firm* — Kim & Stewart LLP

(57) ABSTRACT

When a shingled magnetic recording (SMR) hard disk drive (HDD) receives a write command that references one or more target logical block addresses (LBAs) and determines that one or more target LBAs are included in a range of LBAs for which data are stored in a memory of the drive, additional data are written to the media cache of the SMR HDD along with the write data during the same disk access. The additional data include data that are stored in the volatile memory and are associated with one or more LBAs that are adjacent in LBA space to the target LBAs. The one or more LBAs that are adjacent in LBA space to the target LBAs may include a first group of LBAs that is adjacent to and follows the target LBAs and a second group of LBA that is adjacent to and precedes the target LBAs.

9 Claims, 10 Drawing Sheets

(56) References Cited

U.S. PATENT DOCUMENTS

| | | | |
|---|---|---|---|
| 9,454,991 B2* | 9/2016 | Sutardja | G06F 3/0611 |
| 9,711,172 B1* | 7/2017 | Teguri | G11B 5/59627 |
| 9,733,841 B2* | 8/2017 | Sutardja | G06F 3/0611 |
| 2006/0005074 A1* | 1/2006 | Yanai | G06F 3/0601 |
| | | | 714/6.32 |
| 2012/0300326 A1* | 11/2012 | Hall | G11B 5/012 |
| | | | 360/15 |
| 2014/0379990 A1* | 12/2014 | Pan | G06F 12/0804 |
| | | | 711/135 |
| 2015/0318022 A1* | 11/2015 | Sutardja | G06F 3/0611 |
| | | | 360/31 |
| 2016/0320981 A1* | 11/2016 | Sutardja | G06F 3/0611 |
| 2017/0031630 A1 | 2/2017 | Dawkins et al. | |
| 2017/0200460 A1* | 7/2017 | Teguri | G11B 5/59627 |
| 2017/0220264 A1 | 8/2017 | Sokolov et al. | |
| 2017/0249969 A1* | 8/2017 | Aiello | G11B 20/1217 |
| 2017/0344276 A1* | 11/2017 | Sutardja | G11B 5/5526 |
| 2017/0364446 A1* | 12/2017 | Pham | G06F 12/1027 |

OTHER PUBLICATIONS

Brown et al., "Flash Memory vs. RAM: What's the Difference?", Nov. 5, 2017, pp. 1-6, https://web.archive.org/web/20171105233347/ https://searchstorage.techtarget.com/feature/Flash-memory-vs-RAM-Whats-the-difference (Year: 2017).*

* cited by examiner

SHINGLED MAGNETIC RECORDING DRIVE THAT UPDATES MEDIA CACHE DATA IN-PLACE

BACKGROUND

Magnetic hard disk drives (HDDs) have been employed in information technology as a low-cost means for providing random access to large quantities of data. Consequently, as digital technologies have greatly expanded the need for data storage in all aspects of modern life, areal density of information stored in HDocDs has continuously increased. However, there is a physical limitation for the minimum width of a write head when using conventional data recording techniques, such as perpendicular magnetic recording (PMR). This minimum width has prevented further decreases in written track width and areal density of HDDs, even though the width of a read head can be further reduced.

A recently developed technology that has further increased the areal density of magnetic HDDs is shingled magnetic recording (SMR). In an HDD that employs SMR, adjacent data tracks on a magnetic disk are each written (one group at a time) so as to overlap, and therefore overwrite, a portion of the previously written data track. As a result, the data tracks written in an SMR HDD are compressed in width to allow for increased data density in an HDD.

However, SMR HDDs have a significant drawback. Once a data track is written in a shingled structure, that data track cannot be updated in place because that would overwrite and destroy data in one or more adjacent and overlapping data tracks. That is, random block overwrites cannot be performed on shingled data tracks without disturbing existing data. To avoid re-writing an entire group of shingled data tracks each time a host requests an overwrite of data within that group of tracks, data associated with write requests are commonly stored in a so-called "media cache." Typically, the media cache is located in a non-SMR region of the HDD, thereby allowing random block writes to the HDD. Such data stored in the media cache can be later written into the appropriate SMR region of the HDD along with other write data associated with that SMR region.

Unfortunately, a read request received by an SMR HDD that includes some data stored in the SMR region and some data stored in the media-cache region of the HDD can result in poor drive performance. For example, multiple portions of a particular document or file may be updated by the host, and each update requires a writing of data blocks associated with the document to a different and generally non-contiguous location in the media cache of the HDD. Consequently, a subsequent read request by the host for the entire document will effectively be translated into multiple random read requests, as the drive seeks to the various locations in the SMR region and the media-cache region of a disk to read the most up-to-date data associated with each portion of the requested document.

SUMMARY

One or more embodiments provide systems and methods for executing a write command in a shingled magnetic recording (SMR) hard disk drive (HDD). When the SMR HDD receives a write command that references one or more target logical block addresses (LBAs) and includes write data, the write data are written to a media cache of the HDD in a conventional magnetic recording (CMR) region of the HDD. According to various embodiments, when the one or more target LBAs are determined to be included in a range of LBAs for which data are already stored in the volatile memory of the drive, additional data from the volatile memory are written to the media cache of the SMR HDD along with the write data during the same disk access. Specifically, the additional data include data that are stored in the volatile memory and are associated with one or more LBAs that are adjacent in LBA space to the target LBAs. Furthermore, in some embodiments, the one or more LBAs that are adjacent in LBA space to the target LBAs include a first group of LBAs that is adjacent to and follows the one or more target LBAs in logical address space and a second group of LBA that is adjacent to and precedes the one or more target LBAs. Thus, the data associated with the target LBAs are stored within a contiguous block of physical locations in the CMR region that store data for a contiguous block of adjacent LBAs in LBA space. As a result, when the write command modifies a portion of a file that has been recently read by the host, the entire modified file can be read from a single location in the CMR region of the HDD, i.e., with a single disk access operation.

A method of storing data in a magnetic disk drive with a shingled magnetic recording region (SMR), a conventional magnetic recording region (CMR), and a volatile memory, according to an embodiment, comprises receiving a write command from a host, wherein the write command references a first logical block address (LBA) in a logical address space associated with the magnetic disk drive and includes first data associated with the first LBA; in response to the write command, determining whether the volatile memory stores data associated with the first LBA and second data associated with a second LBA that is adjacent in the logical address space to the first LBA; when the volatile memory is determined to store data associated with the first LBA and the second data associated with a second LBA, sequentially writing the first data to a first physical location in the CMR region and the second data to a second physical location in the CMR region that is adjacent to the first physical location.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
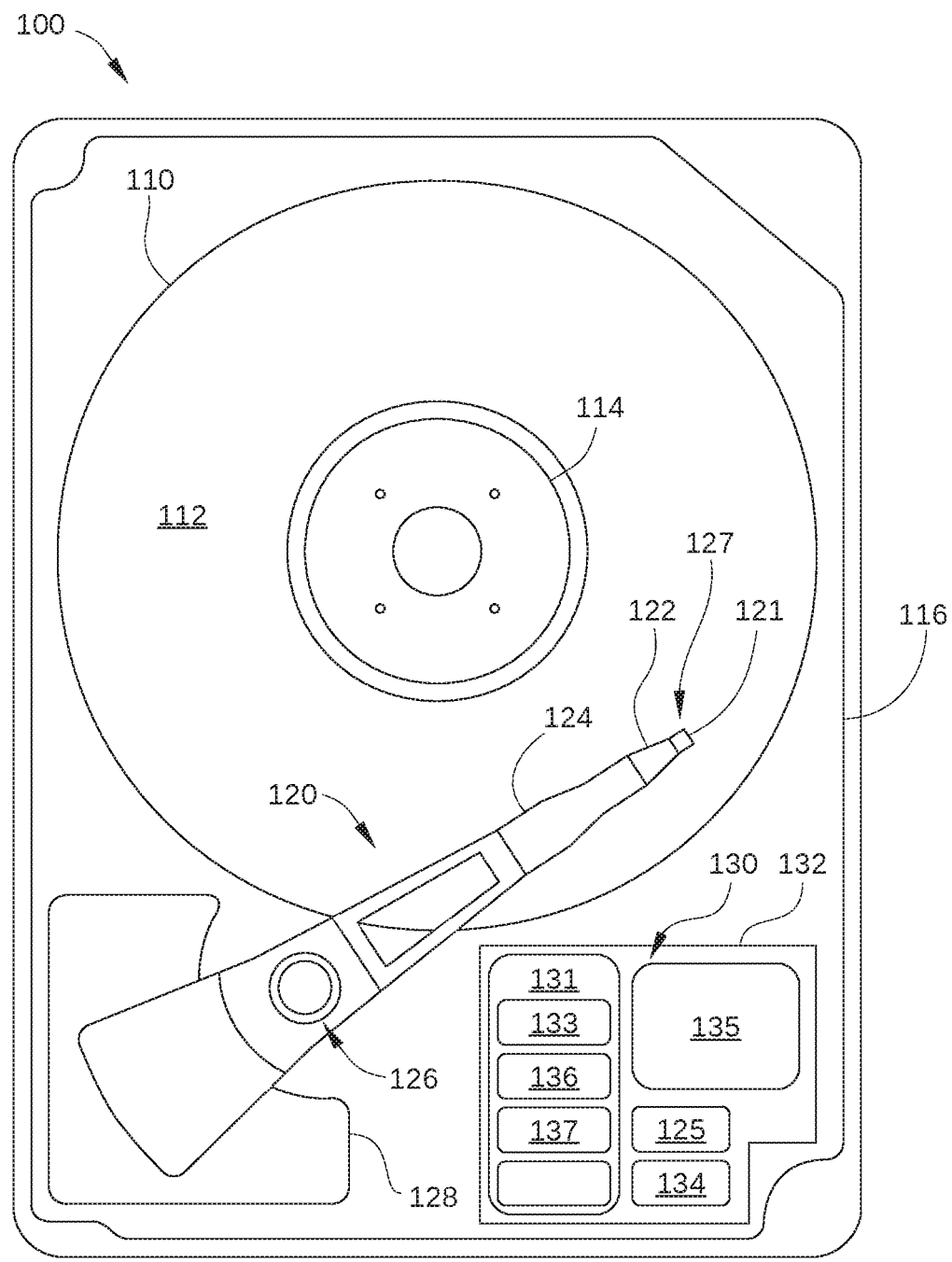
FIG. 1 is a schematic view of an exemplary hard disk drive, according to one embodiment.

FIG. 1 is a schematic view of an exemplary hard disk drive (HDD) 100, according to one embodiment. For clarity, HDD 100 is illustrated without a top cover. HDD 100 includes multiple storage disks 110 (only one of which is visible in FIG. 1) that each include one or two recording surfaces 112 on which a plurality of concentric data storage tracks are disposed. Storage disks 110 are coupled to and rotated by a spindle motor 114 that is mounted on a base plate 116. An actuator arm assembly 120 is also mounted on base plate 116, and includes multiple sliders 121 (only one of which is visible in FIG. 1), each mounted on a flexure arm 122 with a magnetic read/write head 127 that reads data from and writes data to the data storage tracks of an associated recording surface 112. Each flexure arm 122 is attached to an actuator arm 124 that rotates about a bearing assembly 126. Voice coil motor 128 moves all of the multiple sliders 121 radially relative to a recording surface 112 of a storage disk 110, thereby positioning read/write head 127 over a desired concentric data storage track. Spindle motor 114, read/write head 127, and voice coil motor 128 are coupled to electronic circuits 130, which are mounted on a printed circuit board 132. In some embodiments, each read/write head 127 has an associated additional actuator. The additional actuator (not shown in FIG. 1) could be on the suspension (i.e., flexure arm 122), at the gimbal between the suspension and slider 121, or even on slider 121, and can move the associated read/write head 127 radially a small distance. Such actuators are generally referred to as dual-stage actuators, and enable the servo system of HDD 100 to attain more accurate tracking control.

Electronic circuits 130 include a read channel 137, a microprocessor-based controller 133, random-access memory (RAM) 134 (which may be a dynamic RAM and is used as one or more data buffers) and/or a flash memory device 135 and may also include a flash manager device 136. In some embodiments, read channel 137 and microprocessor-based controller 133 are included in a single chip, such as a system-on-chip 131. In some embodiments, HDD 100 may further include a motor-driver chip 125 that accepts commands from microprocessor-based controller 133 and drives both spindle motor 114 and voice coil motor 128. Read/write channel 137 communicates with the read/write head 127 via a preamplifier (not shown) that may be mounted on a flex-cable that is itself mounted on either base plate 116, actuator arm 120, or both.

When data are transferred to or from a particular storage disk 110 of HDD 100, actuator arm assembly 120 moves in an arc between the inner diameter (ID) and the outer diameter (OD) of the storage disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and the attached read/write head 127 with respect to the particular storage disk 110. Voice coil motor 128 is coupled with a servo system that uses the positioning data read from servo wedges on storage disk 110 by read/write head 127 to determine the position of read/write head 127 over a specific data storage track. For example, the servo system positions read/write head 127 over recording surface 112 based on positioning data read from recording surface 112.

In positioning a read/write head 127 over a recording surface 112, the servo system determines an appropriate current to drive through the voice coil of voice coil motor 128, and drives said current using a current driver and associated circuitry. Typically, the appropriate current is determined based in part on a position feedback signal of the read/write head 127, i.e., a position error signal (PES). The PES is typically generated by using servo patterns included in the servo wedges (not shown) on the recording surface 112 as a reference. One embodiment of a recording surface 112 is illustrated in FIG. 2.

Figure 2:
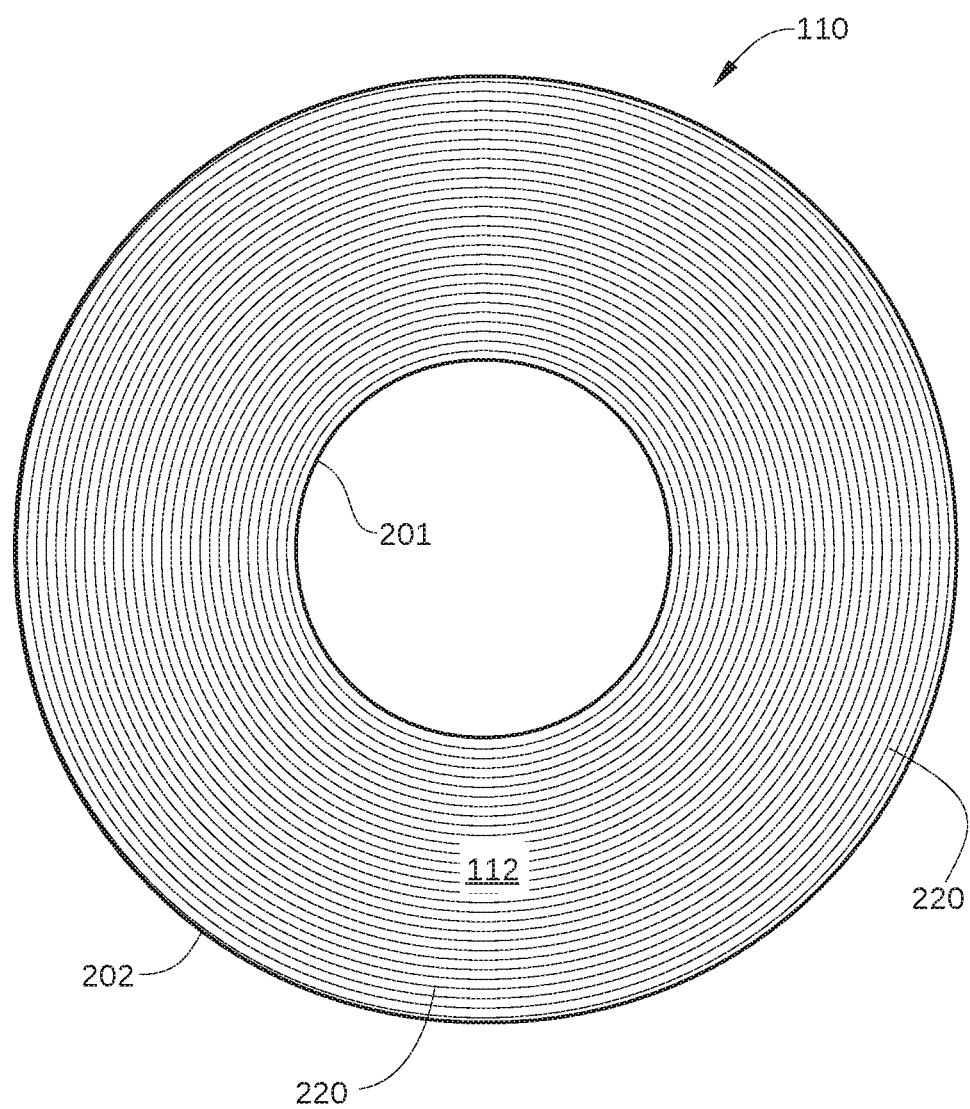
FIG. 2 schematically illustrates a recording surface of a storage disk with concentric data storage tracks formed thereon, according to an embodiment.

FIG. 2 schematically illustrates a recording surface 112 of a storage disk 110 with concentric data storage tracks 220 formed thereon, according to an embodiment. Data storage tracks 220 are formed on recording surface 112 between an ID 201 and an OD 202 of storage disk 110. Data storage tracks 220 are configured for storing data, and the radial position and track pitch, i.e., spacing, of data storage tracks 220 is defined by servo sectors (not shown) formed on recording surface 112. Each servo sector contains a reference signal that is read by read/write head 127 during read and write operations to position read/write head 127 above a desired data storage track 220. Typically, the actual number of data storage tracks 220 included on recording surface 112 is considerably larger than illustrated in FIG. 2. For example, recording surface 112 may include hundreds of thousands of concentric data storage tracks 220. The majority of data storage tracks 220 are disposed in a user region of recording surface 112, while the remainder of data storage tracks 220 are disposed in a media-cache region, as shown in FIG. 3.

Figure 3:
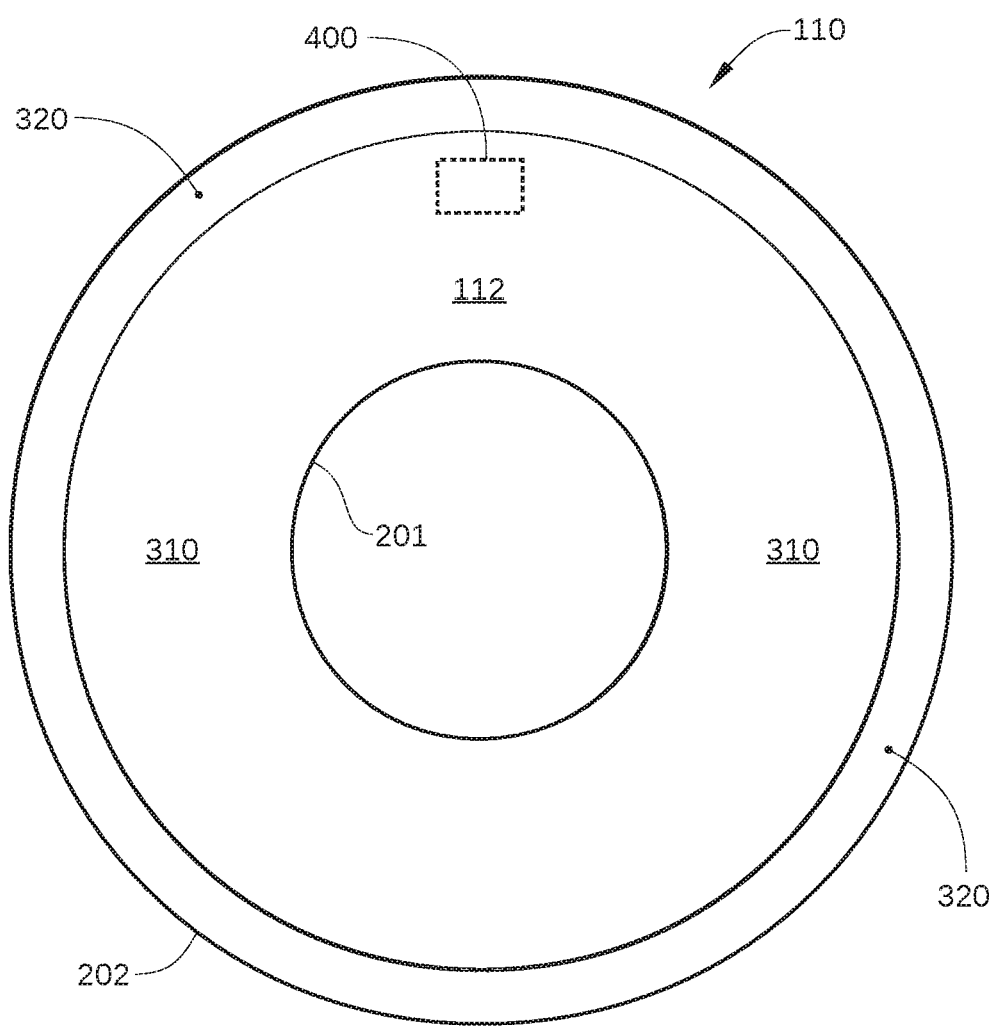
FIG. 3 schematically illustrates a user region of recording surface and a media-cache region of the recording surface, according to an embodiment.

FIG. 3 schematically illustrates a user region 310 of recording surface 112 and a media-cache region 320 of recording surface 112, according to an embodiment. For clarity, data storage tracks 220 formed on recording surface 112 are not shown in FIG. 3. In the embodiment illustrated in FIG. 3, media-cache region 320 is disposed proximate OD 202 of recording surface 112 and user region 310 includes the remainder of recording surface 112. In other embodiments, media-cache region 320 may be disposed in any other region of recording surface 112, for example in a region proximate ID 201, and/or in a middle diameter (MD) region of recording surface 112, or even distributed across a number of regions between the OD 202 and ID 201. Generally, user region 310 includes the majority of the storage capacity of recording surface 112.

User region 310 is a shingled magnetic recording (SMR) region of recording surface 112 that includes data storage tracks 220 that are arranged in groups, or "bands," of data storage tracks. Each band of data storage tracks is typically separated from adjacent bands by guard regions, which are inter-band gaps in which no data tracks are formed. Further, the data storage tracks formed in user region 310 are written in an SMR format, and therefore overlap adjacent data tracks in the same band. Thus, each band in user region 310 includes a plurality of overlapping data tracks that each have a width that is significantly narrower than a width of the write element included in read/write head 127. One embodiment of such a band is illustrated in FIG. 4.

Figure 4:
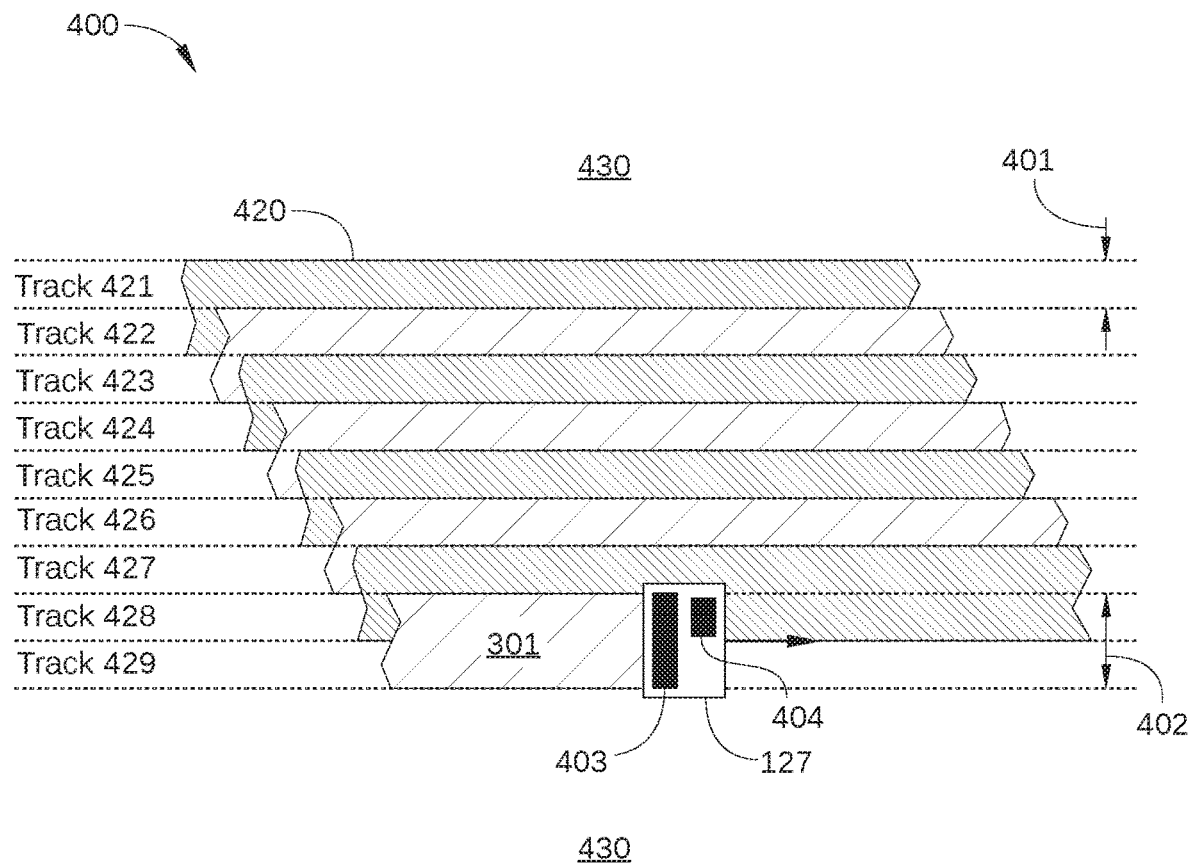
FIG. 4 is a schematic illustration of a portion of a recording surface indicated in FIG. 3 that includes a band of SMR data tracks, according to an embodiment.

FIG. 4 is a schematic illustration of a portion 400 of recording surface 112 indicated in FIG. 3 that includes a band 420 of SMR data tracks, according to an embodiment. Band 420 includes a plurality of SMR data tracks 421-429, and is separated from adjacent bands (not shown) by guard regions 430. As shown, each of SMR data tracks 421-429 overlaps and/or is overlapped by at least one adjacent SMR data track. As a result, each of SMR data tracks 421-429 has a readable width 401 that is significantly less than an as-written width 402. It is noted that in the embodiment illustrated in FIG. 4, band 420 only includes nine SMR data tracks, whereas in practice band 420 may include up to one hundred or more SMR data tracks.

Also shown in FIG. 4 is read/write head 127, which is configured with a write head 403 and a read head 404 that are each designed for SMR. As such, read head 404 is configured with a width that is approximately equal to readable width 401, and is positioned within read/write head 127 to facilitate reading of SMR data tracks 421-429. Furthermore, write head 403 is positioned within read/write head 127 to facilitate writing of SMR data tracks 421-429 with as-written width 402. In accordance with the principle of SMR, as-written width 402 exceeds readable width 401, for example by a factor of two. Thus, as a particular one of SMR data tracks 421-429 is written, write head 403 is positioned to overlap a significant portion of the preceding SMR data track.

Returning to FIG. 3, media-cache region 320 is configured to store media-cache entries during normal operation of HDD 100. As such, media-cache region 320 includes conventional data storage tracks, i.e., data storage tracks that are not written in an SMR format and instead are written in a conventional magnetic recording (CMR) format, and therefore are substantially non-overlapping. Thus, media-cache region 320 can be used to store random block writes without an entire band of shingled tracks being re-written for each write command received. For example, when HDD 100 receives a write command that includes write data and a range of logical block addresses (LBAs) indicated in user region 310 for the storage of the write data, the write data can be written to a physical location in media-cache region 320 rather than to the physical locations of user region 310 that correspond to the LBA range referenced in the write command. The physical location in media-cache region 320 is mapped to the LBAs associated with the write data, so that the write data can be retrieved based on LBAs included in a subsequent read command.

Write data stored in media-cache region 320 can be flushed to an appropriate band in user region 310 periodically, in response to one or more specified events, or at any other convenient time. For instance, when a particular band in user region 310 is determined to store a quantity of invalid data that exceeds a predetermined threshold quantity, data stored in that particular band can be updated by re-writing the entire band to include the most recent version of any invalid data. Thus, that particular band is rewritten to include write data that are stored in media-cache region 320 and are mapped to LBAs in that band. In addition, if the media-cache region becomes full (or nearly full), data that are stored only in media-cache 320 can be flushed to user region 310 to make more room in media-cache region 320. Generally, each block or set of data being flushed to user region 310 is associated with a particular LBA that corresponds to a particular physical location in user region 310. Therefore, each block or set of data being flushed to user region 310 is stored in the corresponding physical location in user region 310.

It is noted that a particular document or file stored in HDD 100 is typically associated with a range of LBAs (or with multiple ranges of LBAs) that correspond to specific physical locations in user region 310. However, in light of the above-described use of media-cache region 320 as a media cache for user region 310, the most recent data associated with a particular document or file may be fragmented between multiple locations in media-cache region 320. That is, the most up-to-date (i.e., valid) data associated with the document may be stored in a combination of physical locations in media-cache region 320. As a result, to execute a read command that includes such a fragmented document or file, data are read from multiple locations in media-cache region 320, thereby slowing the performance of HDD 100 significantly. One such situation is illustrated in FIGS. 5A-5C.

Figure 5A:
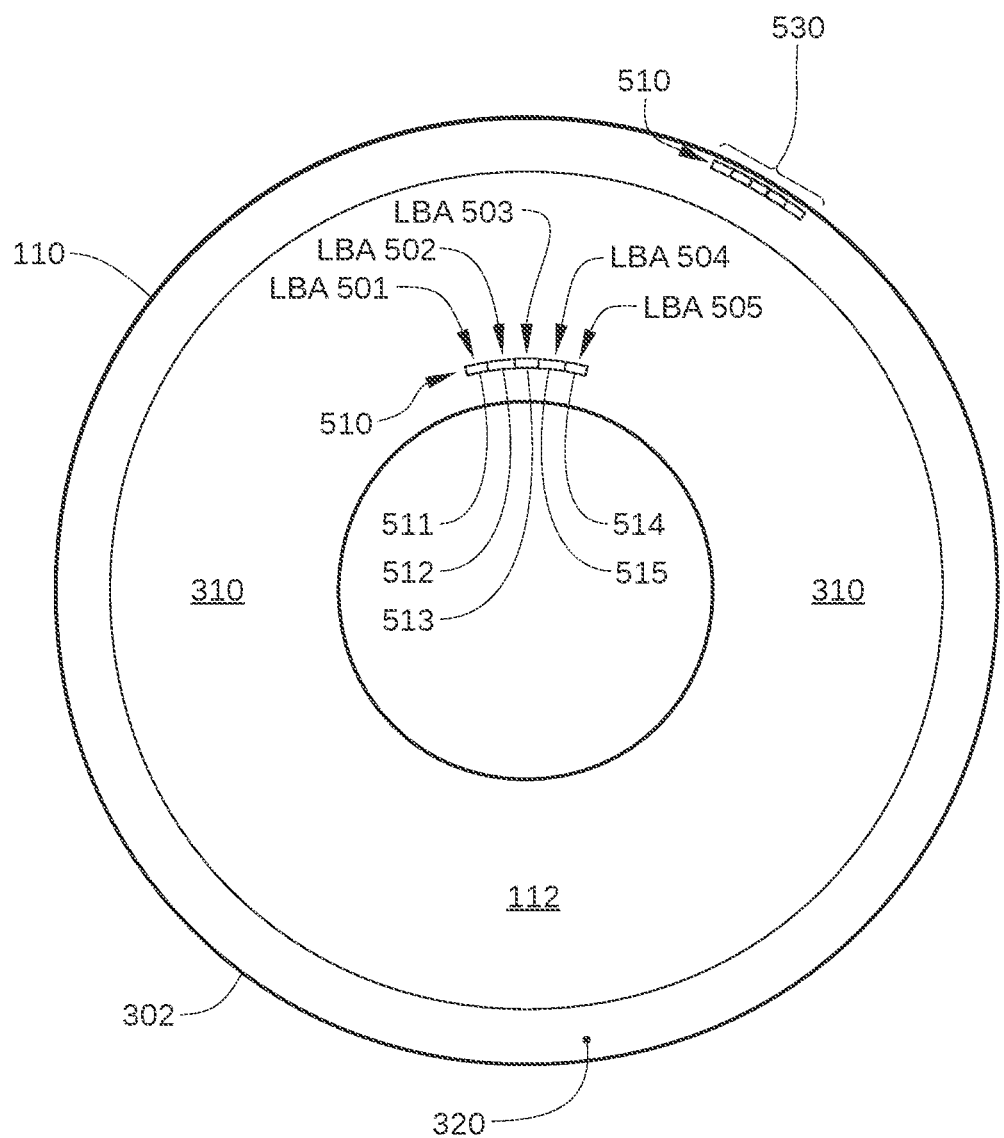
FIG. 5A-5C schematically illustrate data blocks associated with a particular file that is stored in a media-cache region of a storage disk.
Figure 5B:
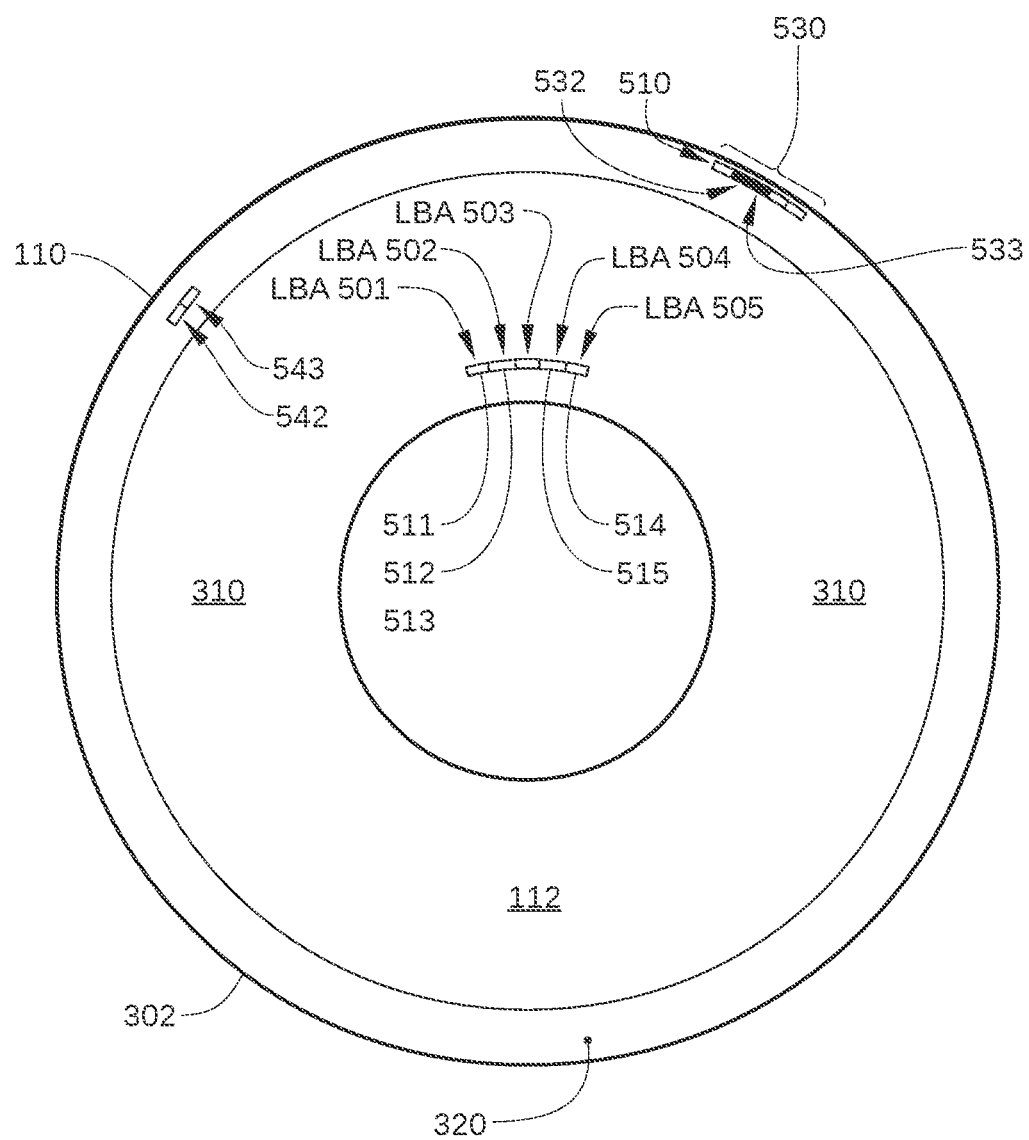
Figure 5C:
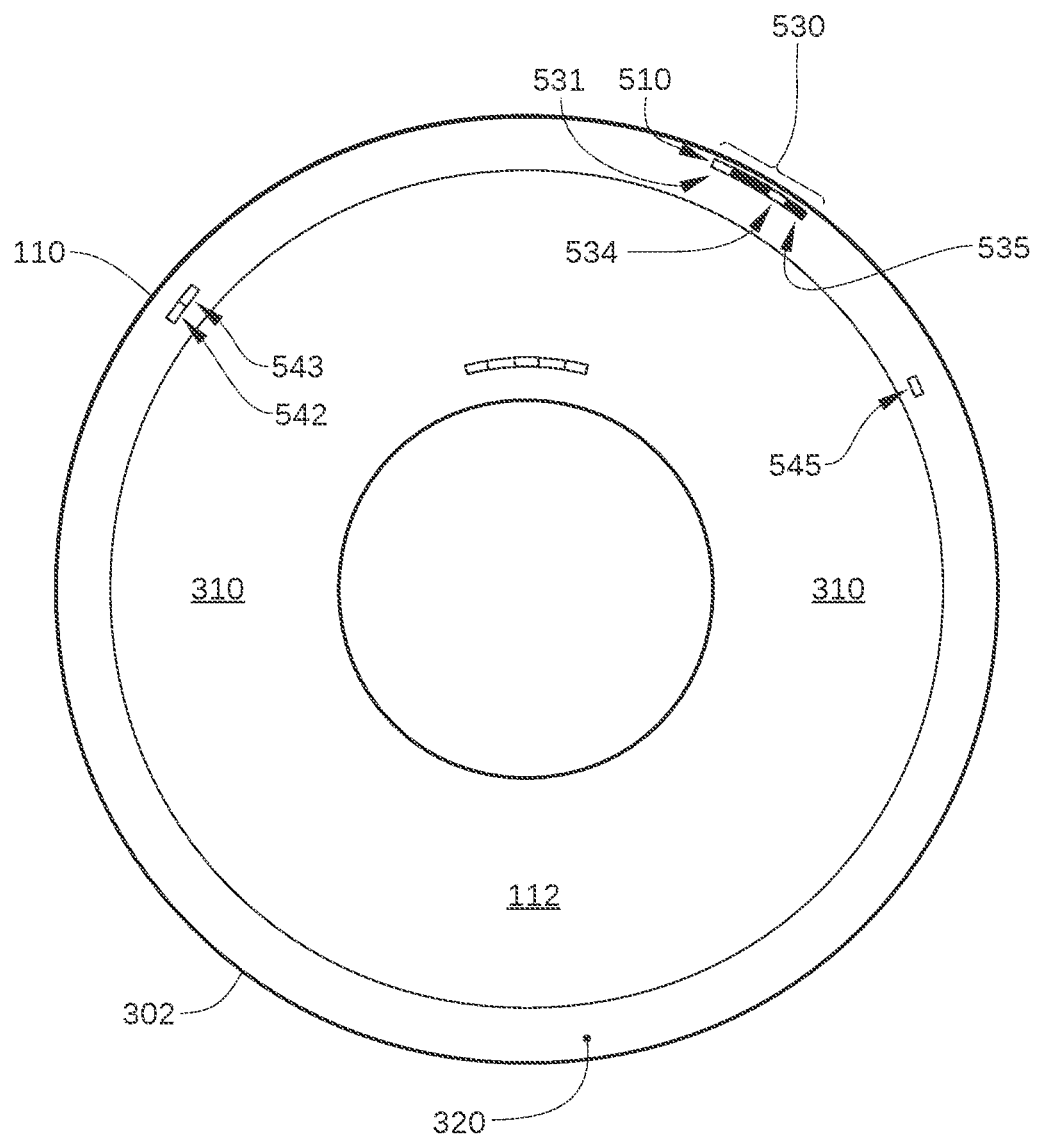

FIG. 5A-5C schematically illustrate data blocks associated with a particular file 510 that is stored in media-cache region 320 of storage disk 110. File 510 is a document or file that is made up of data (specifically a group of data blocks) associated with a single group of sequential LBAs in the logical address space of HDD 100. In FIGS. 5A-5C, file 510 is associated with LBAs 501-505, and each of LBAs 501-505 is associated with a respective physical location included in user region 310, such as a 512 byte or 4 KB sector. LBAs 501-505 correspond to physical locations 511-515, respectively, in user region 310. Thus, when stored in user region 310, the data block of file 510 that is associated with LBA 501 is stored in physical location 511; the data block of file 510 that is associated with LBA 502 is stored in physical location 512; the data block of file 510 that is associated with LBA 503 is stored in physical location 513, and so on.

Media-cache region 320 is typically employed as a circular buffer. When a data block of file 510 is stored in media-cache region 320, that data block is typically stored in the next available physical location in the circular buffer of media-cache region 320, rather than always being stored in the same physical location. As a result, even when the data blocks of file 510 may all be initially stored in a single contiguous group 530 of physical locations in media-cache region 320, as portions of file 510 are subsequently updated, the most up-to-date data for file 510 includes data blocks stored in media-cache region 320 that are not included in contiguous group 530 of physical locations. Instead, the data blocks of file 510 that have been updated are stored in some other physical location in media-cache region 320. Thus, the most up-to-date data for file 510 can often be stored in multiple non-contiguous physical locations in media-cache region 320, and multiple disk access operations are required for file 510 to be read from HDD 100.

For example, as illustrated in FIG. 5A, HDD 100 receives a first write command from a host that references file 510, and stores the valid data blocks associated with LBAs 501-505 in contiguous group 530 of physical locations in media-cache region 320. HDD 100 then receives a second write command from the host that updates data associated with a portion of file 510, for example LBAs 502 and 503. That second write command from the host that updates data associated with a portion of file 510 may occur after many other write commands that are associated with other files, for example hundreds or thousands. Many or all of these other write command may have also resulted in data being written to the media cache. The result, as shown in FIG. 5B, is that data associated with LBAs 502 and 503 and stored in physical locations 532 and 533 of contiguous group 530 is flagged or otherwise indicated as invalid, and the data from the second write command (for LBAs 502 and 503) is stored in physical locations 542 and 543 in media-cache region 320. As shown, physical locations 542 and 543 may be located on a different data storage track and include different sectors than the physical locations of contiguous group 530. HDD 100 then receives a third write command from the host that updates data associated with LBA 505. The result, as shown in FIG. 5C, is that data stored in physical location 535 is flagged or otherwise indicated as invalid, and the data from the third write command (for LBA 505) is stored in physical location 545 in media-cache region 320. Thus, after two write commands updating a portion of file 510, the multiple data blocks associated with LBAs 501-505 are no longer adjacent to or even proximate each other, and are instead typically scattered throughout media-cache region 320. Therefore, when HDD 100 receives a read command to read all of the data associated with file 510 (i.e., LBAs 501-505), multiple disk access operations are required to read the most recent data associated with LBAs 501-505. That is, microprocessor-based controller 133 causes read/write head 127 to seek to physical locations 531 and 534 and read data stored therein via a first disk access operation, causes read/write head 127 to seek to physical locations 542 and 543 and read data stored therein via a second disk access operation, and causes read/write head 127 to seek to physical location 545 and read data stored therein via a third disk access operation.

Because seeking to a specific data storage track is generally a time-consuming operation, for example taking on the order of 10 milliseconds or more, the above-described plurality of seeks for a single read command results in significant latency when compared to reading data from a single contiguous group of physical locations in media-cache region 320, such as contiguous group 530. According to embodiments of the invention, a read command is executed in an SMR HDD, such as HDD 100, with fewer disk accesses and reduced latency over a conventional SMR HDD. In such embodiments, when a write command is received that references a target LBA that is determined to be included in a range of LBAs for which data are already stored in a solid-state memory of HDD 100, such as RAM 134, additional data from the volatile solid-state memory are written to the media cache of the SMR HDD along with the write data during the same disk access. Specifically, the additional data include data that are already stored in the solid-state memory and are associated with one or more LBAs that are adjacent in LBA space to the target LBA. One such embodiment is illustrated in FIGS. 6A and 6B.

Figure 6A:
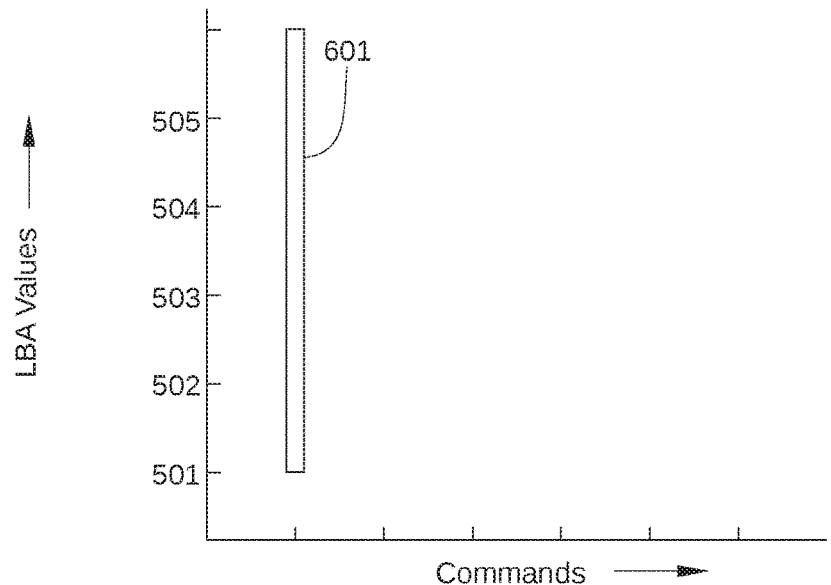
FIG. 6A schematically illustrates the LBA range of a command associated with a file that is received by a hard disk drive from a host, and FIG. 6B schematically illustrates physical locations on a storage disk of data included in the command, according to an embodiment.
Figure 6B:
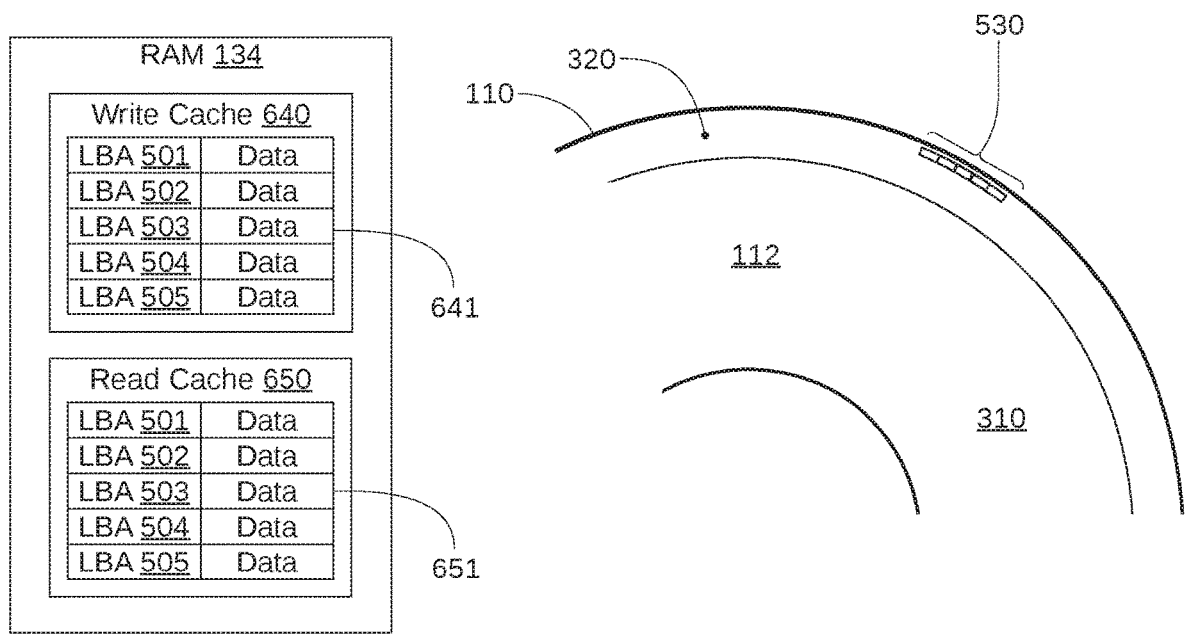

FIG. 6A schematically illustrates the LBA range of a command 601 associated with file 510 that is received by HDD 100 from a host, and FIG. 6B schematically illustrates physical locations on storage disk 110 of data included in command 601, according to an embodiment. As shown in FIG. 6A, microprocessor-based controller 133 receives command 601, which references a range of LBAs 501-505 that uniquely identify the blocks of data that make up file 510. For example, in embodiments in which LBAs in the logical address space of HDD 100 each identify a 4 KB block of data, file 510 has a size of about 20 KB.

In some embodiments, command 601 can be a write command received from the host, and therefore includes the data associated with each of LBAs 501-505. In such embodiments, microprocessor-based controller 133 causes the data included in the write command to be written to media-cache region 320. In addition, microprocessor-based controller 133 stores a copy 641 of the data included in the write command in a write cache 640 (see FIG. 6B) for HDD 100 stored in RAM 134.

In some embodiments, command 601 can be a read command that references LBAs 501-505. In such embodiments, command 601 is received by microprocessor-based controller 133, which retrieves the most recent version of data associated with LBAs 501-505. For example, microprocessor-based controller 133 may retrieve the most recent version of such data from one or more locations, including media-cache region 320, user region 310, and/or a read cache 650 (see FIG. 6B) for HDD 100 stored in RAM 134. Microprocessor-based controller 133 then transmits the retrieved data to the host, and also stores a copy 651 of the retrieved data in read cache 650. Copy 651 of retrieved data associated with LBAs 501-505 is typically stored in read cache 650 until evicted or overwritten by subsequent read or write data. Some embodiments may not include separate read cache and write cache, but may keep data from both read and write commands in a single RAM region. In that case, it might still be possible to distinguish cache entries that resulted from read commands from those that resulted from write commands by meta-data in the cache entry, as would be known to one of ordinary skill in the art. For purposes of simplicity, the current description will assume separate read cache and write cache.

As shown in FIG. 6B, after command 601 is received, microprocessor-based controller 133 may store the data associated with LBAs 501-505 in contiguous group 530 of physical locations in media-cache region 320, such as when command 601 is a write command. In addition, after command 601 is received microprocessor-based controller 133 generally stores the data associated with LBAs 501-505 in either copy 641 or copy 651 in RAM 134, depending on whether command 601 is a read or write command. When the host sends a read command for file 510 while copy 641 or 651 is still in RAM 134, microprocessor-based controller 133 can send the requested data without a single disk access operation to storage disk 110. However, in many situations neither copy 641 or copy 651 is present in RAM 134, for example due to the eviction of copy 641 from write cache 640 or the eviction of copy 651 from read cache 650. In such situations, microprocessor-based controller 133 can retrieve the requested data for file 510, i.e., the data associated with LBAs 501-505, with a single disk access operation. Specifically, the data associated with LBAs 501-505 can be read from contiguous group 530 of physical locations in media-cache region 320 with a single seek and read operation.

Figure 7A:
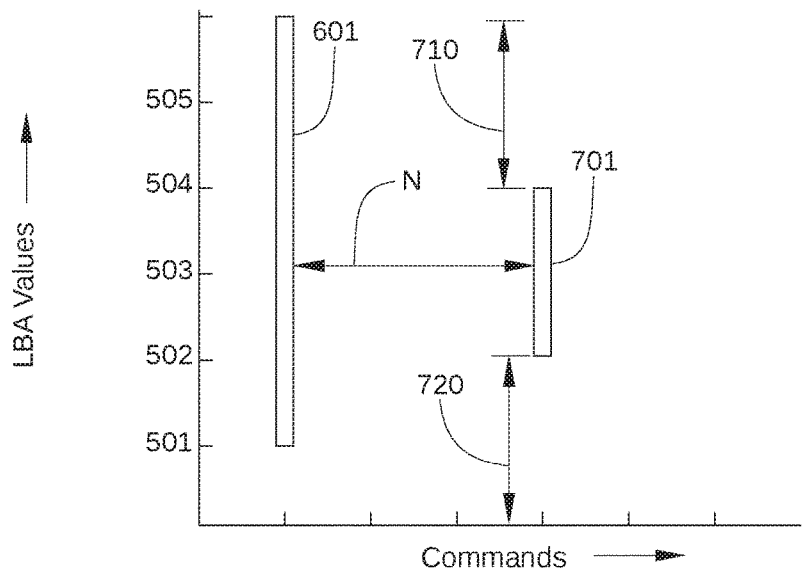
FIG. 7A schematically illustrates the LBA range of a write command associated with a file that is received by a hard disk drive from a host, and FIG. 7B schematically illustrates physical locations on the storage disk of data included in the command, according to an embodiment.
Figure 7B:
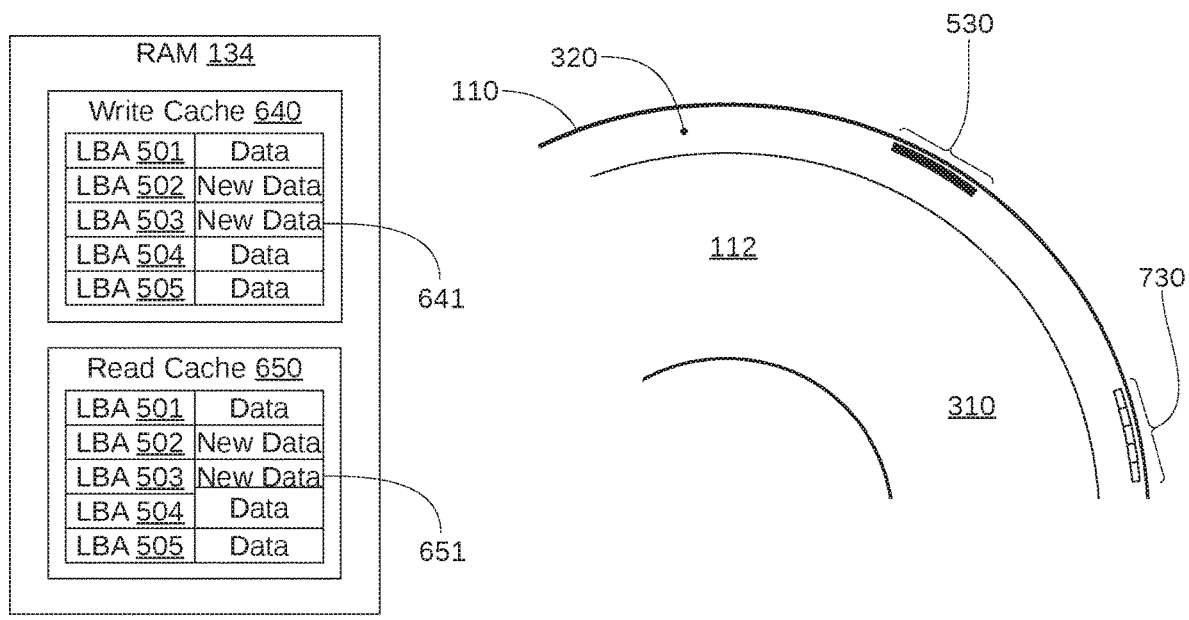

FIG. 7A schematically illustrates the LBA range of a write command 701 associated with file 510 that is received by HDD 100 from a host, and FIG. 7B schematically illustrates physical locations on storage disk 110 of data included in command 701, according to an embodiment. As shown in FIG. 7A, after receiving command 601, microprocessor-based controller 133 receives a certain number N of read or write commands from the host, then receives write command 701. Write command 701 references LBAs 502 and 503, which include a portion of the data that make up file 510. In addition, write command includes a newer version of data for LBAs 502 and 503. That is, write command 701 causes the data associated with LBAs 502 and 503 to be updated.

In a conventional SMR HDD, microprocessor-based controller 133 then causes the data included in write command 701 to be written to the next available physical locations in media-cache region 320, and these physical locations are not contiguous with contiguous group 530. By contrast, according to various embodiments, microprocessor-based controller 133 instead causes additional data that are currently stored in RAM 134 to be written to physical locations in media-cache region 320 along with the data included in write command 701.

In some embodiments, when an LBA in write command 701 (referred to herein as a "target LBA") is determined to be included in a range of LBAs for which data are currently stored in RAM 134, the additional data includes some or all of the data that are stored in RAM 134 and are associated with the LBAs of file 510. For example, when the target LBA is determined to have associated data stored in write cache 640 or read cache 650, some or all of the additional data are also written to media-cache region 320. Alternatively, in some embodiments, when the target LBA is determined to have associated data stored in the read cache 650, the additional data includes some or all of the data stored in read cache 650, but the additional does not include data stored in write cache 640. In such embodiments, some or all of the additional data are also written to media-cache region 320. Because the additional data in such embodiments include data that are stored in read cache 650, i.e., data that were retrieved in response to a read command, and because read commands are more likely to be repeated by a host, in such embodiments, the additional that are also written to media-cache region 320 are associated with LBAs that are the most likely to be included in a subsequent read command from the host. Alternatively or additionally, in some embodiments, the additional data includes the data that are stored in RAM 134 and are associated with LBAs referenced in command 601, i.e., the data associated with LBAs 501-505. That is, when a particular LBA in write command 701 is determined to be included in a range of LBAs for which data are currently stored in RAM 134, the additional data includes data associated with the LBAs of the command that previously resulted in data for that particular LBA to be stored in RAM 134.

Alternatively or additionally, in some embodiments, the additional data include some or all of the data that are stored in RAM 134 and are also associated with LBAs in a first LBA range 710 that is adjacent to and follows (in logical address space) the target LBA and in a second LBA range 720 that is adjacent to and precedes (in logical address space) the target LBA. In such embodiments, first LBA range 710 and second LBA range 720 can be based on an average read command size received from the host. For example, when an average read command size received from the host is estimated, measured, or otherwise determined to be 32 KB, first LBA range 710 and second LBA range 720 can be set equal to or greater than the average read command size of 32 KB. Thus, approximately 64 KB of data are written to media-cache region 320. In this way, all data associated with an average-sized read command is included in the additional data to be written along with the data included in write command 701, even when the target LBA is at the beginning or the end of the range of LBAs associated with the previous command (i.e., command 601). The average read command size can be calculated based on a running average of recently received commands, a total average of commands received from the host over the lifetime of HDD 100 or over a current operating session of HDD 100, or any other suitable quantitative approach.

After command 701 is received and a target LBA is determined to be included in a range of LBAs for which data are currently stored in RAM 134, microprocessor-based controller 133 causes the data associated with the target LBA and the above-described additional data to be written to physical locations in media-cache region 320. In the embodiment illustrated in FIG. 7B, the additional data includes data associated with the LBAs of the command that previously resulted in data for LBAs 502 or 503 to be stored in RAM 134. Thus, as shown in FIG. 7B, microprocessor-based controller 133 causes data included in command 701 and the additional data, i.e., the data associated with LBAs 501-505, to be written to a contiguous group 730 of physical locations in media-cache region 320. As a result, the data stored in contiguous group 530 of physical locations in media-cache region 320 is flagged or otherwise indicated to be invalid. Contiguous group 730 is depicted by a portion of a single data storage track of storage disk 110, but in other embodiments, the LBAs of contiguous group 730 can span multiple data storage tracks. In addition, copy 641 and/or copy 651 in RAM 134 is updated with the new data from command 701, as shown.

As noted above, prior to writing the data associated with LBAs 501-505 to contiguous group 730 of physical locations, the additional data are already stored as either copy 641 or copy 651 in RAM 134, and are therefore immediately available. Furthermore, the data associated with LBAs 501-505 can be read from contiguous group 730 of physical locations in media-cache region 320 with a single seek and read operation, rather than from multiple locations in media-cache region 320.

In some embodiments a command history is also stored in RAM 134 that tracks the LBAs for which data are stored in read cache 651. Thus, when a particular LBA is referenced in a write command that is received from the host, microprocessor-based controller 133 can determine what other LBAs were included in the same command that resulted in the storage of data associated with that particular LBA.

Figure 8:
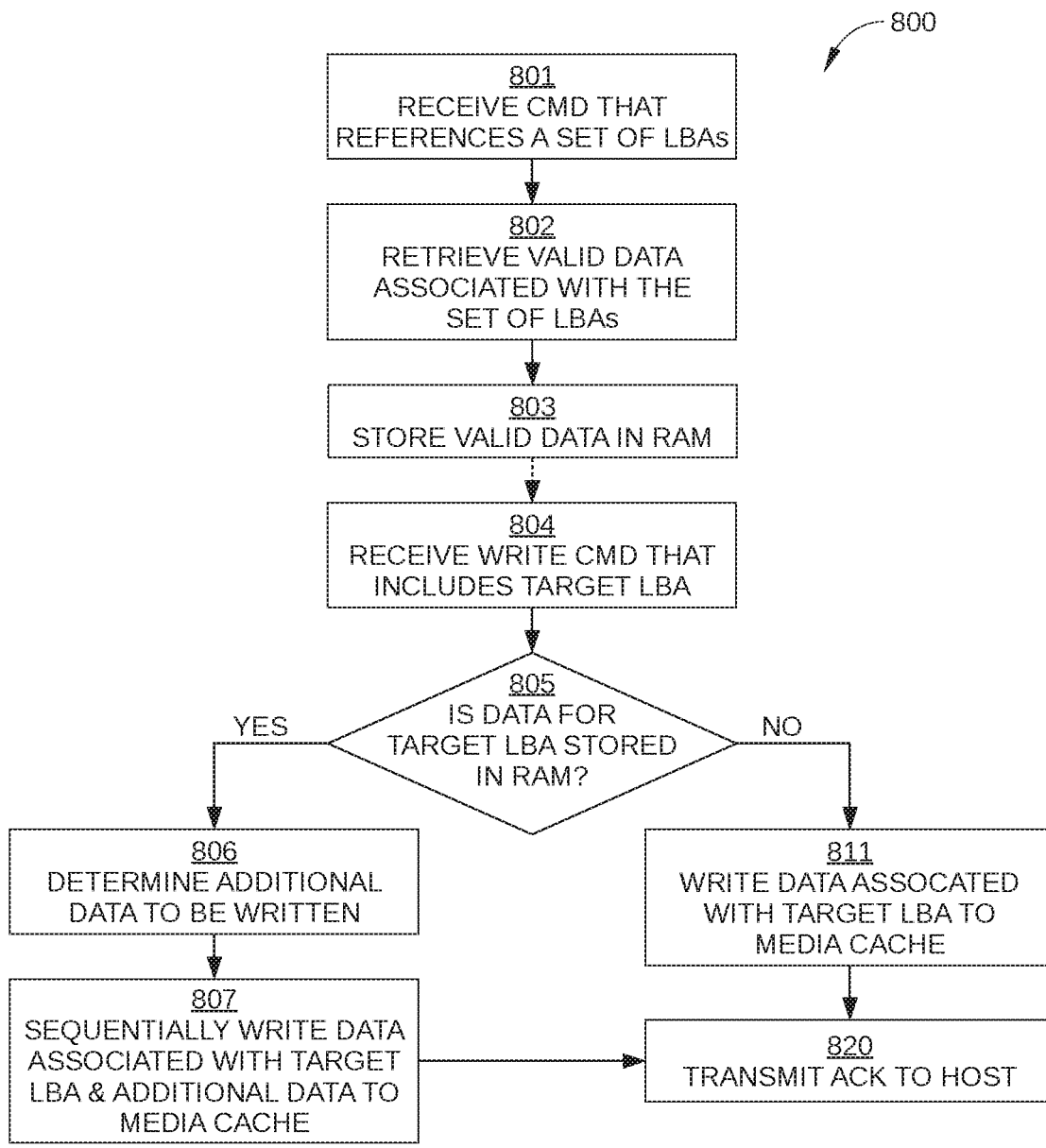
FIG. 8 sets forth a flowchart of method steps for executing a write command in an SMR HDD that includes a CMR region, an SMR region, and a volatile memory, according to an embodiment.

FIG. 8 sets forth a flowchart of method steps for executing a write command in an SMR HDD that includes a CMR region (e.g., media-cache region 320), an SMR region (e.g., user region 310), and a volatile solid-state memory (e.g., RAM 134), according to an embodiment. Although the method steps are described in conjunction with HDD 100 in FIGS. 1-7B, persons skilled in the art will understand that the method steps may be performed with other types of systems. The control algorithms for the method steps reside in microprocessor-based controller 133 in whole or in part as software- or firmware-implemented logic, and/or as hardware-implemented logic circuits.

As shown, a method 800 begins at step 801, when microprocessor-based controller 133 receives a command from a host external to HDD 100 that references a set of LBAs, such as LBAs 501-505. The command can be a write command or a read command.

In step 802, when the command received is a read command, microprocessor-based controller 133 retrieves valid data associated with the LBAs referenced in the received command. Some or all of the data may be read from user region 310, media-cache region 320, and/or RAM 134 (such as in read cache 650). When the command received is a write command, the valid data associated with the set of LBAs are included in the write command.

In step 803, microprocessor-based controller 133 stores the valid data retrieved in step 802 in RAM 134, for example in read cache 650 or write cache 640.

In step 804, microprocessor-based controller 133 receives a subsequent write command from the host that includes one or more target LBAs, i.e., LBAs for which data included in the write command are to be stored.

In step 805, microprocessor-based controller 133 determines whether data associated with a target LBA referenced in the write command received in step 804 is stored in RAM 134. For example, microprocessor-based controller 133 can search read cache 650 and/or write cache 640 for the target LBA to determine whether data associated with target LBA are stored in RAM 134. If yes, method 800 proceeds to step 806; if no, method 800 proceeds to step 811.

In step 806, microprocessor-based controller 133 determines additional data to be written, as described above in conjunction with FIGS. 7A and 7B.

In step 807, microprocessor-based controller 133 sequentially writes the data associated with the target LBA and the additional data determined in step 806 to a group of contiguous physical locations 730 in media-cache region 320.

In step 820, microprocessor-based controller 133 transmits an acknowledgement to the host that the write command has been completed. If the host has enabled write-caching, then the acknowledgement may be transmitted earlier (i.e., as soon as the data has been successfully transferred from the host to the HDD). Thus, in some embodiments, when write-caching is enabled in HDD 100, step 820 can be performed at an earlier step in method 800, for example after step 804 (after the data from the write command referenced in step 804 has been received by the drive and stored in RAM).

In step 811, microprocessor-based controller 133 writes data associated with the target LBA to media-cache region 320, and the method proceeds to step 820.

In sum, the implementation of method 800 enables execution of a read command in an SMR HDD with fewer disk accesses and reduced latency over a conventional SMR HDD. Because write commands that modify data already stored in RAM are written to media cache with additional data for adjacent LBAs, a subsequent read command from a host is more likely to be located in a single contiguous group of physical locations in the media cache region or at least in a reduced number of physical locations in the media cache region. Consequently, the number of different disk access operations needed to execute the read command is reduced for read commands targeting a set of LBAs that have been partially updated with write commands.

While the foregoing is directed to embodiments of the present invention, other and further embodiments of the invention may be devised without departing from the basic scope thereof, and the scope thereof is determined by the claims that follow.

We claim:

1. A disk drive comprising:
a shingled magnetic recording (SMR) region;
a conventional magnetic recording (CMR) region;
a volatile memory; and
a controller configured to
in response to a write command from a host, wherein the write command references a first logical block address (LBA) in a logical address space associated with the disk drive and includes first data associated with the first LBA, and the write command is received when second data associated with a second LBA that is adjacent in the logical address space to the first LBA is stored in the CMR region, determine whether the volatile memory stores data associated with the first LBA and the second data, and upon determining that the volatile memory stores the data associated with the first LBA and the second data, sequentially write the first data to a first physical location in the CMR region and the second data to a second physical location in the CMR region that is adjacent to the first physical location and is different from a third physical location in the CMR region in which the second data is also stored.

2. The disk drive of claim 1, wherein the controller sequentially writes the first data to the first physical location and the second data to the second physical location during a single disk access operation.

3. The disk drive of claim 1, wherein the controller is configured to sequentially write third data to a third physical location in the CMR region that is adjacent to one of the first and second physical locations, the third data being stored in the volatile memory before receiving the write command and associated with a set of LBAs that are contiguous in the logical address space with the first LBA.

4. The disk drive of claim 3, wherein the controller is further configured to:
upon receiving a read command that references the set of LBAs, retrieve valid data for the set of LBAs from one of the SMR region and the CMR region, and store the valid data in the volatile memory,
wherein the third data includes at least a portion of the valid data.

5. The disk drive of claim 3, wherein the set of LBAs includes LBAs in a first LBA range that is adjacent to and follows the first LBA in logical address space and a second LBA range that is adjacent to and precedes the first LBA in the logical address space.

6. The disk drive of claim 4, wherein the controller is further configured to determine from a history of commands received from the host, that the read command includes the set of LBAs.

7. The disk drive of claim 6, wherein retrieving valid data for the set of LBAs from one of the SMR region and the CMR region comprises retrieving valid data for the set of LBAs from both the SMR region and the CMR region.

8. The disk drive of claim 1, wherein the first physical location comprises a first sector in the CMR region and the second physical location comprises a second sector in the CMR region.

9. The disk drive of claim 1, wherein the data associated with the first LBA and the first data are prior and current versions of the data associated with the first LBA, respectively.

* * * * *